United States Patent [19]

Vobach

[11] Patent Number: 5,307,412
[45] Date of Patent: Apr. 26, 1994

[54] RANDOM CODING CIPHER SYSTEM AND METHOD

[76] Inventor: Arnold R. Vobach, 11114 Ashcroft, Houston, Tex. 77096

[21] Appl. No.: 953,521
[22] Filed: Sep. 30, 1992
[51] Int. Cl.⁵ ............................................. H04L 9/02
[52] U.S. Cl. ...................................... 380/42; 380/22; 380/46
[58] Field of Search ................... 380/22, 42, 46, 47, 380/28

[56] References Cited

U.S. PATENT DOCUMENTS

| | | | |
|---|---|---|---|
| 2,730,569 | 1/1956 | Street | 380/22 |
| 2,949,501 | 8/1960 | Hell | 380/22 |
| 3,067,280 | 12/1962 | Schlafly, Jr. | 380/22 |
| 3,911,216 | 10/1975 | Bartek et al. | 380/22 |
| 4,193,131 | 3/1980 | Lennon et al. | 380/46 |
| 4,202,051 | 5/1980 | Davida et al. | 380/46 |
| 4,206,315 | 6/1980 | Matyas et al. | 380/28 |
| 4,301,327 | 11/1981 | Lee et al. | 380/28 |
| 4,326,098 | 4/1982 | Bouricius et al. | 380/47 |
| 4,341,925 | 7/1982 | Doland | 380/46 |
| 4,369,434 | 1/1983 | Mueller | 380/46 |
| 4,408,093 | 10/1983 | Place | 380/42 |
| 4,418,275 | 11/1983 | Oosterbaan et al. | 380/46 |
| 4,441,095 | 4/1984 | Widmer et al. | 380/28 |
| 4,447,672 | 5/1984 | Nakamura | 380/42 |
| 4,488,001 | 12/1984 | Cooley et al. | 380/42 |
| 4,638,120 | 1/1987 | Herve | 380/46 |
| 4,667,301 | 5/1987 | Chiu et al. | 380/46 |
| 4,751,733 | 6/1988 | Delayaye et al. | 380/42 |
| 4,776,011 | 10/1988 | Busby | 380/28 |
| 4,791,669 | 12/1988 | Kage | 380/47 |
| 4,853,962 | 8/1989 | Brockman | 380/47 |
| 4,979,832 | 12/1990 | Ritter | 380/28 |
| 5,038,376 | 8/1991 | Mittenthal | 380/28 |
| 5,133,444 | 5/1992 | Vobach | 380/47 |
| 5,193,115 | 3/1993 | Vobach | 380/46 |
| 5,214,704 | 5/1993 | Mittenthal | 380/28 |

OTHER PUBLICATIONS

"An Introduction to TRIARCH 2000", Jul. 1989, Rich, Inc., pp. 2-30, 76 Beaver St, 14th floor, New York, NY 10005.
"TRIARCH 2000 Trading Information Architecture", 5 pages, Rich Inc., A Reuter Co. 1989.
"Trading Room Systems", Product Information Brochure, Rich Inc., A Reuter Co., 4 pages, Apr. 15, 1989.
"Trading Information Systems Requirements, An Overview", J. Naden et al. IEEE Comm. Sec., New York Section Seminar, Dec. 4, 1986, pp. 1-12.

*Primary Examiner*—Salvatore Cangialosi
*Attorney, Agent, or Firm*—Gunn & Kuffner

[57] ABSTRACT

In a random coding cipher system and method, a sender and receiver pair share a long string of random digits, the masking tape. To encrypt a plaintext message, the sender generates a random integer (with a random number generator, RNG) or a pseudo-random integer (using a pseudo-random number generator, PRNG). This is the initializing integer. The sender then selects an integer formed from a subset of the digits of the initializing integer. This is the starting integer for the message. The starting integer determines a starting, or indexing, position in the masking tape for extraction of a sequence of blocks of digits, of common length, to be put in one-to-one correspondence with the characters of the plaintext alphabet used for communication. The integer blocks comprise the numerical synonyms for the plaintext alphabet characters. By checking successive candidate digit blocks for prior association with plaintext alphabet characters, the one-to-one correspondence between numerical synonyms and alphabet characters is maintained. The concatenation of the numerical synonyms corresponding to successive message characters comprises the plaintext message string integer. A string of digits from the masking tape, beginning immediately after the last integer chosen for coding alphabet characters and of length equal to that of the plaintext message string, is added to the plaintext message string. This new random digit string is the masking tape string integer. The sum of the plaintext message string and the masking tape string is the ciphertext string integer which, preceded by the initializing integer, is sent as the cryptogram. To decrypt, the receiver uses the starting integer to determine the numerical synonyms and masking tape string, subtracts the masking tape string from the ciphertext string and recovers the plaintext message string and the plaintext message.

53 Claims, 3 Drawing Sheets

RANDOM CODING CIPHER SYSTEM AND METHOD

FIELD OF THE INVENTION

The present invention relates generally to computing systems and methods. More particularly, the present invention relates to a cipher system and method for encrypting and decrypting computer data.

BACKGROUND OF THE INVENTION

A common method of encrypting a plaintext message starts by substituting integers for plaintext characters according to some standard alphabet such as ITA2, ITA5, ASCII, or EBCDIC. These integers are then written in binary form to create a first string, or sequence, of 0's and 1's. The first string is modulo 2-added to another, second sequence of 0's and 1's to produce a third sequence of 0's and 1's. The third sequence of 0's and 1's is transmitted as the encrypted message. The sender's object is to make this third string of 0's and 1's appear to be a random sequence of digits in binary form. The intended receiver modulo 2-adds the second sequence to the third sequence to recover the first sequence. Thereafter, the original plaintext message is derived from the standard alphabet that was used, e.g., ITA2, ITA5, ASCII, or EBCDIC. If the second sequence is truly random, an interceptor-attacker will be unable to reproduce the first sequence. Thus, the plaintext message is preserved.

There are a number of problems with this scheme: First, random number strings are a relatively scarce commodity. Second, the receiver must have at hand exactly the same random number sequence the sender used or must be able to reproduce it. Having at hand exactly the same random number sequence the sender used requires the sharing of an enormous amount of key material. The sharing of an enormous amount of key material is impractical. Reproducing exactly the same random number sequence the sender used is impossible.

To avoid these two difficulties, a pseudo-random number generator is commonly employed by both sender and receiver. A pseudo-random number generator is a deterministic machine which, when initialized by a "seed" number, produces a string of digits which appears to be random (by passing various statistical tests). The output of a pseudo-random number generator is periodic, but the period can be made very long. When sender and receiver use pseudo-random number generators to produce the second, key, or encrypting sequence, they start with a common initializing "seed" and synchronize the outputs of their generators. Starting with a common initializing "seed" and synchronizing the outputs of the generators allows a knownplaintext attack in which an interceptor-attacker gains access to plaintext (hence to its binary digit string equivalent in terms of some standard numerical alphabet) and to the corresponding ciphertext. Knowing the digits of the binary plaintext string enables the attacker to reproduce the corresponding pseudo-random number sequence. This frequently allows the attacker to determine the algorithm, initializing "seed," and output sequence of the system's pseudo-random number generator, thus "breaking" the code.

In U.S. Pat. No. 5,113,444, entitled "Random Choice Cipher System and Method," issued to the same inventor as that of the present invention, a string of random digits is added to a string of integers numerically coding the plaintext characters of a message. The summed integer is the body of the cryptogram.

The numerical codings, "numerical synonyms," are randomly chosen from large, randomly dispersed collections of such integers corresponding to the plaintext alphabet characters. The collections of randomly distributed numerical synonyms and their matchings to the characters of a plaintext alphabet comprise a "thesaurus" which must be shared by a sender-receiver pair. So also must be shared a "masking tape," a long string of random digits from which the string of random digits, to be added to the numerical coding of the message, is selected.

The present invention dispenses with the thesaurus, using instead one-time numerical codings for message characters which are themselves extracted from the masking tape.

SUMMARY OF THE INVENTION

A sender and receiver pair share a long string of random digits, the masking tape. To encrypt a plaintext message, the sender generates a random number (with a random number generator, RNG) or a pseudo-random number (using a pseudo-random number generator, PRNG). As used herein, the term "number generator" refers to either or both a RNG and a PRNG. The sender then selects an integer formed from a subset of the digits of this first, initializing integer. This second (subset) integer is the starting integer for the message. The method of formation (choice of position of the digits and their ordering, etc.) of the starting integer from the digits of the initializing integer is shared by sender and receiver.

The starting integer determines a starting, or indexing, position in the masking tape for extraction of successive blocks of digits, of common length, to be put in one-to-one correspondence with the characters of the plaintext alphabet used for communication. The successive integer blocks comprise the numerical synonyms for the plaintext alphabet characters. The concatenation of the numerical synonyms corresponding to successive message characters constitutes the plaintext message string integer.

Clearly, in associating the successive blocks of masking tape digits with successive plaintext alphabet characters to yield numerical synonyms, the possibility exists of encountering repeated digit blocks—causing a numerical synonym to represent two or more alphabet characters. This is avoided by checking each successive candidate block of digits to see if it has been previously assigned to an alphabet character. If it has, one passes to the next succeeding block; if it has not, it is assigned to the next alphabet character lacking a numerical synonym. A simple looping and branching computer routine can accomplish this very quickly.

One must next determine how many successive digit blocks must be searched through to guarantee a numerical synonym for each alphabet character. Consider, for example, the EBCDIC alphabet, a fairly large alphabet of 256 characters. Also consider a string of 600 ($<(2.5)256$) random 3-digit integers. We shall estimate the probability that such a string contains at least 256 distinct integers—enough for numerically coding the EBCDIC alphabet.

Let $X_i$, $i=000,\ldots,999$ be a random variable from the sets, R, of 600 random 3-digit integers to $\{0,1\}$ defined by $X_i(R)=1$ if $i$ is in R and 0 if $i$ is not in R. $X_i$ is a Bernoulli random variable with p=600 (1/1000)=0.6, 1−p=0.4, mean 0.6 and variance 0.24. Let $$S(R) = \sum_{i=000}^{999} X_i.$$

This is the number of distinct integers in R. Since at least 400 of the $X_i$'s are automatically zero (and perhaps even 599 of the remaining), $$S(R) = S_{600}(R) = \sum_{k=1}^{600} X_{i(k)}.$$

$S_{600}$ is a binomial random variable with mean 600(0.6)=360 and variance 600(0.24)=144. Both np=360 and n(1−p)=240 are much greater than 5 and 600 is large; $S_{600}$ is well-approximated by a normal distribution. Standardizing the variable with Z=($S_{600}$−360)/12), the probability that there are at least 256 available numerical synonyms, $$Prob(256 \leq S_{600}) = Prob((256-360)/12 \leq Z) \approx \Phi(8.66),$$

the cumulative distribution function for the standard normal distribution evaluated at 8⅔ standard deviations to the right of the mean. The probability that there are 256 or more distinct integers available for numerical synonyms in a random string of 600 3-digit integers is greater than 0.9999.

The search for numerical synonyms can be shortened by using 4-digit numerical synonyms, but this causes data (bandwidth) expansion in the ciphertext string.

Naturally, any scheme for matching numerical synonyms from the masking tape with alphabet characters may be employed, so long as sender and receiver go through the same process and have at hand the same original string of digits.

Since a quick and sure means of associating a sequence of digit blocks (numerical synonyms) with plaintext alphabet characters exists, phrases like "successive digit blocks," as applied to the determination of numerical synonyms, will hereafter refer to successive distinct digit blocks.

The plaintext message string integer could be transmitted, following the initializing integer; however, any attacker who knows the length of the numerical synonyms could apply a frequency analysis to the plaintext message string. To impede this, the sender might encrypt the original message as a string of short, separately encrypted messages. Changing the numerical synonyms frequently slows down the encryption process. It would seem more efficient to use a single plaintext message string and a single masking tape string to conceal each other, a basic feature of the invention of the '444 patent.

Instead of a masking tape, the output of a PRNG may be used to generate the numerical synonyms, with the starting integer (or some other integer extracted from the initializing integer) used as the initializing "seed" for the output of the PRNG.

The point of concealing the starting integer in the initializing integer is, when a masking tape is used, to conceal the location of the numerical codings and the masking tape string integer in the masking tape.

If an attacker knows both the nature of the PRNG and the ordering of the plaintext alphabet, concealing the starting integer-initializing seed when a PRNG is used prevents the attacker from generating the same plaintext character-numerical synonym correspondence.

The masking tape string integer, extracted from the masking tape, commences immediately following the numerical coding of the last plaintext alphabet character. The masking tape loops back to its beginning if exhausted during the encryption of a message. If a PRNG is used, instead of a masking tape, the masking tape string integer is the output of the PRNG following the numerical coding of the last plaintext alphabet character. A second PRNG, initialized by a second initializing seed concealed in the initializing integer, may be used to generate the masking tape string integer.

Naturally, a masking tape and a PRNG may be used together, one for the coding of the alphabet and the other to generate the masking tape string integer.

The masking tape string integer is added to the right, with "carries" to the right, to the plaintext message string integer to form the ciphertext string integer. The ciphertext string, prefixed by the initializing integer, is sent off as the cryptogram.

To decrypt, the receiver extracts the starting integer from the initializing integer and looks in the masking tape, beginning at the position determined by the starting integer, to determine the successive digit blocks being used as numerical synonyms for the plaintext alphabet characters. These are used to translate the plaintext message string into the plaintext message. After the numerical synonyms are identified, the masking tape string integer is read out of the masking tape and subtracted (to the right) from—"peeled off"—the ciphertext string to reveal the plaintext message string, which is then converted into the plaintext message.

If a PRNG, instead of a masking tape, is utilized, the starting integer-initializing seed determines the output of the PRNG and hence the numerical synonyms for the plaintext alphabet characters and the masking tape string integer. Decryption then proceeds as above.

Long messages can be broken into blocks of not necessarily equal length, each of which can be encrypted separately according to prior arrangement between sender and receiver, with new choices of numerical synonyms for each block.

As long as the masking tape string is truly random, the ciphertext string integer will also be random, and the system, like its predecessor in the '444 patent, retains the property of perfect secrecy.

As with the system and method of the '444 patent, the ciphertext string may be adulterated by prefixing, suffixing or interspersing random or pseudo-random integers of variable length. It may also be subjected to block permutations of its digits.

The advantages of the present system over that of the '444 patent are that it requires no shared thesaurus and no attendant table lookups. After the brief initial delay required to encode the alphabet, the system is faster. Also, numerical synonyms and corresponding blocks of masking tape digits can be kept minimally short, eliminating or greatly reducing data expansion in the body of the cryptogram.

Modifications to the system and method above include the following:

The initializing integer may contain (concealed) both the starting integer and the initializing seed for a PRNG, the output of which provides the successive blocks of digits used as numerical synonyms. The starting integer here merely indexes the beginning of the masking tape string. The system is still perfectly secure since the masking tape string is random. Sender and receiver, of course, share identical PRNG's.

In a second modification, sender and receiver no longer share even a masking tape, but only identical PRNG's. In this version, the sender conceals the initializing seed for his PRNG in an initializing integer generated by a second PRNG. (The reason for using this second, auxiliary PRNG is to avoid transmitting "in the clear" the output of the PRNG used for encryption-decryption.) The output of the first or primary PRNG, determined by the initializing seed, generates the successive blocks of integers for the numerical synonyms of the plaintext alphabet characters, and then subsequent output is used as a substitute for the masking tape string integer. If desired, a second initializing seed, concealed in the initializing integer, can be used to initiate the PRNG's production of the masking tape string substitute, or this second initializing seed can be used to initiate the production of the masking tape string substitute by means of a third PRNG. Required PRNG's must, of course, be shared by sender and receiver.

The following simple example is offered to illustrate the working of the basic system. For the sake of simplicity, there are no prefixed, suffixed, or interspersed random or pseudo-random integers. Nor are there block permutations of the digits of the ciphertext string.

Consider the plaintext message:
GOOD_MORNING.

Let the three-digit numerical synonyms for the plaintext characters be as follows:
For "G," 416;
For "O," 580;
For "D," 353;
For "_," 133;
For "M," 069;
For "R," 887;
For "N," 405;
For "I," 318;
For ".," 331.

Let the masking tape string be:
5209805475854585547625322569109344892269.

Adding the plaintext message string integer to the masking tape string integer, with carries to the right, gives:
9364710388395816143533207513383498956901.

This is the ciphertext string, and, preceded by an initializing integer, constitutes the cryptogram.

To decrypt, the receiver subtracts the masking tape string, with carries from the right, and recovers the concatenation of numerical synonyms,
4165805803531336695808874053184054163331,
from which the plaintext message is obtained.

These and other features will be apparent to those of skill in the art from the following detailed description when read in conjunction with the accompanying drawings.

DETAILED DESCRIPTION OF PREFERRED EMBODIMENTS

Figure 1:
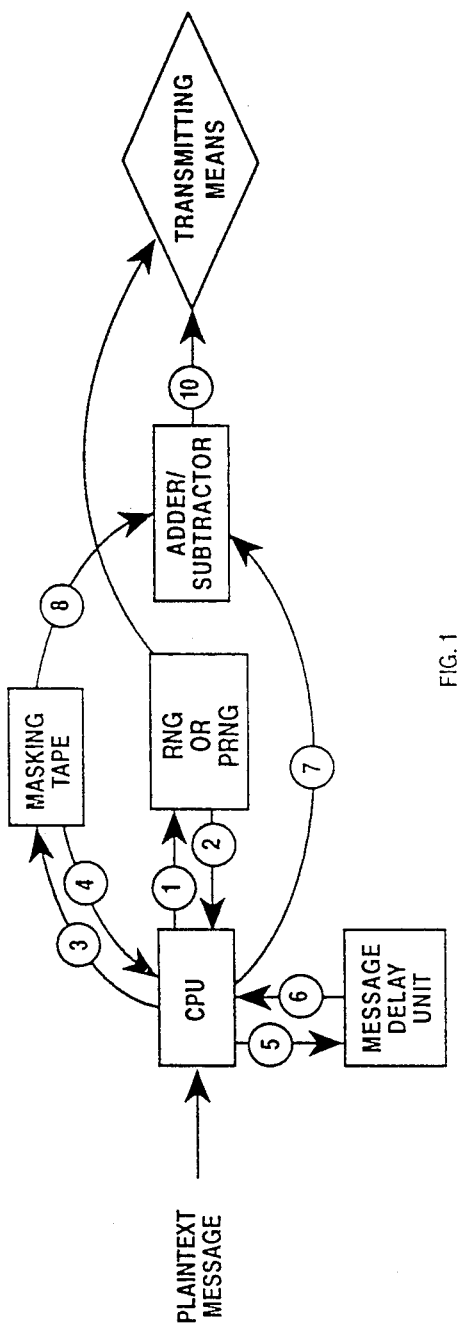
FIG. 1 is a flowchart illustrating the encryption of a plaintext message by a preferred embodiment of the invention.

Referring to FIG. 1, upon receipt of the first character of a plaintext message, the central processing unit (CPU) instructs the RNG or PRNG, by link 1, to produce a random (pseudo-random) initializing integer which the RNG (PRNG) returns to the CPU by link 2 and sends to the transmitting means by link 9.

The CPU extracts the starting integer from the initializing integer and sends it to the masking tape by link 3. The masking tape returns a string of digits, by link 4, which the CPU uses, in successive blocks, to code for the plaintext alphabet characters.

While the CPU is loading numerical synonyms, the first few plaintext characters are sent by link 5 to the message delay unit (MDU). When the CPU is ready to translate them into numerical synonyms, they are sent back by link 6.

The CPU, once the coding of alphabet characters by numerical synonyms has been completed, instructs the masking tape, by link 3, to direct its continuing readout to the adder/subtracter via link 8. This continuing readout is the masking tape string integer.

The timing is to be such that the first numerical synonym for the first plaintext character arrives, via link 7, at the adder/subtracter substantially simultaneously with the first corresponding segment of the masking tape string to which it is to be added. Subsequent numerical synonyms and corresponding masking tape segments are substantially simultaneously sent to the adder/subtracter from the CPU and masking tape by links 7 and 8, respectively.

In the adder/subtracter, the plaintext message string and masking tape string are added to the right, with carries to the right, and their sum is sent by link 10 to the transmitting means where it falls in behind the initializing integer for the transmission to the intended receiver.

Figure 2:
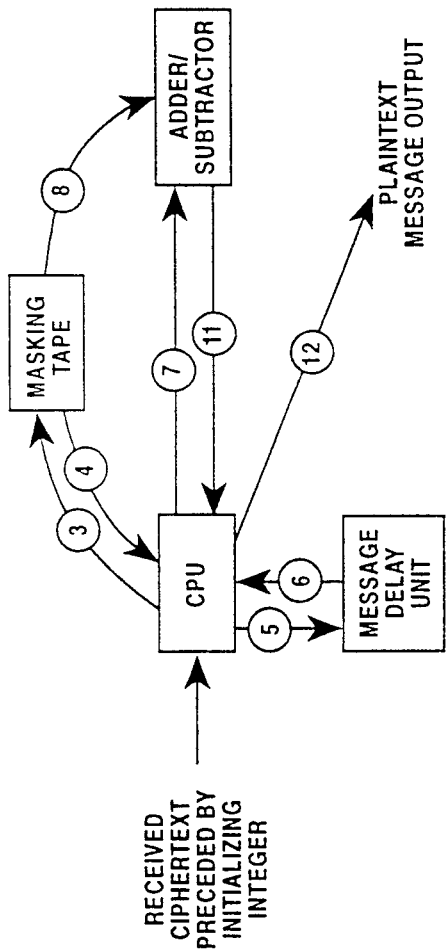
FIG. 2 is a flowchart illustrating the decryption of a received cryptogram by an apparatus similar to that of FIG. 1.

As shown in FIG. 2, upon receipt of an encrypted message, the CPU extracts the starting integer from the initializing integer and sends it, by link 3, to the masking tape which uses it to index the digit string, successive blocks of which comprise the numerical synonyms of the plaintext alphabet characters. The numerical synonyms are sent back to the CPU by link 4. While the CPU is loading the numerical synonyms it will use to retrieve the plaintext message characters, the first portion of the ciphertext string is sent by link 5 to the message delay unit.

When the translation table of numerical synonyms has been loaded into the CPU, the masking tape sends succeeding digits (the masking tape string integer) to the adder/subtracter by link 8.

The CPU retrieves the first portion of the ciphertext string from the message delay unit by link 6 and sends it and the rest of the ciphertext string, by link 7, coincident with the transmission of the masking tape string integer (by link 8), to the adder/subtracter. The adder/subtracter subtracts the masking tape string (to the right, with "carries" to the left) and transmits the plaintext message string back to the CPU by link 11.

The CPU replaces successive numerical synonyms by their plaintext character equivalents and outputs the plaintext message to, e.g., a printer by link 12.

Figure 3:
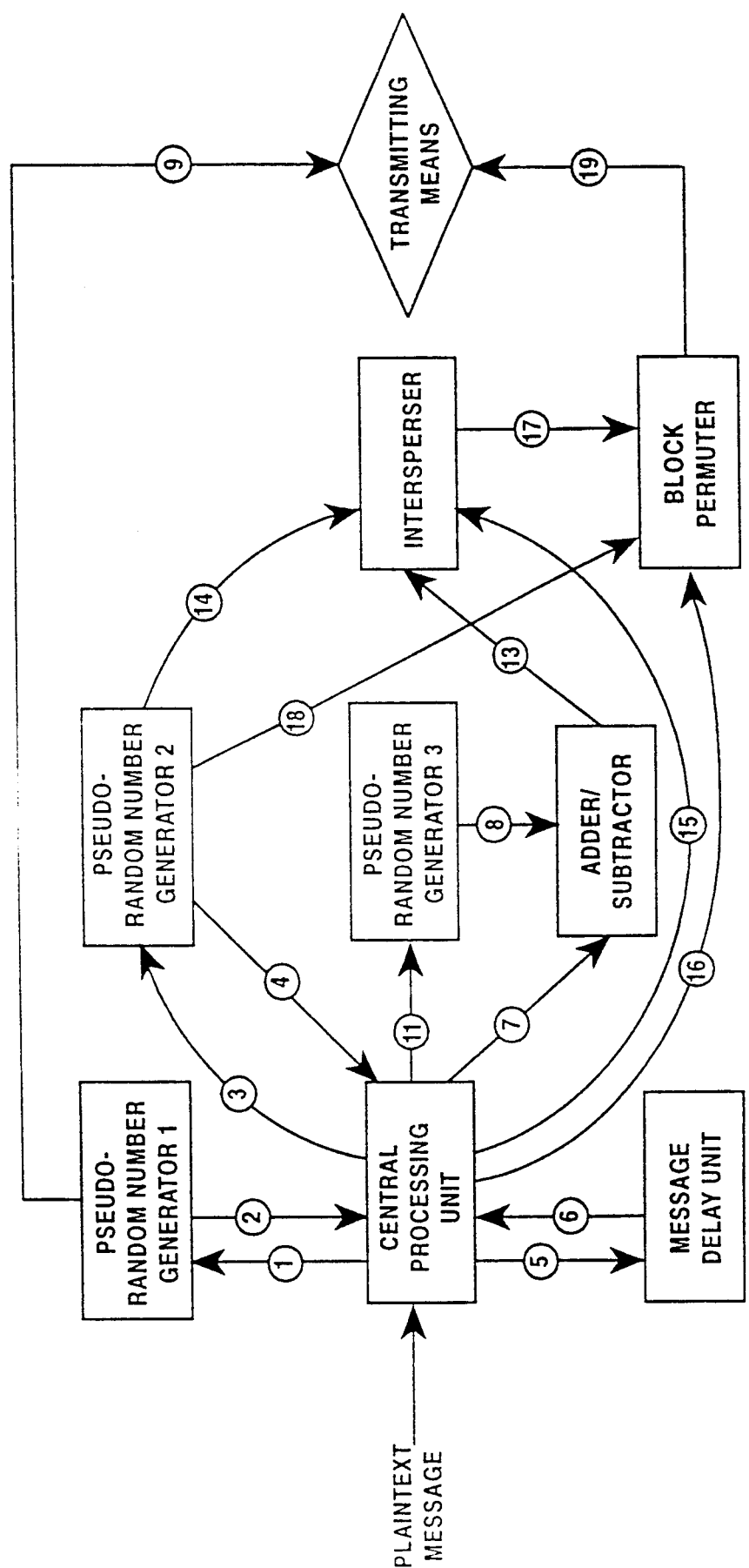
FIG. 3 is a flowchart illustrating the encryption of a message in an embodiment of the invention in which a first PRNG generates the initializing integer; a second PRNG generates the numerical synonyms, and a third PRNG generates the masking tape string integer.
Figure 4:
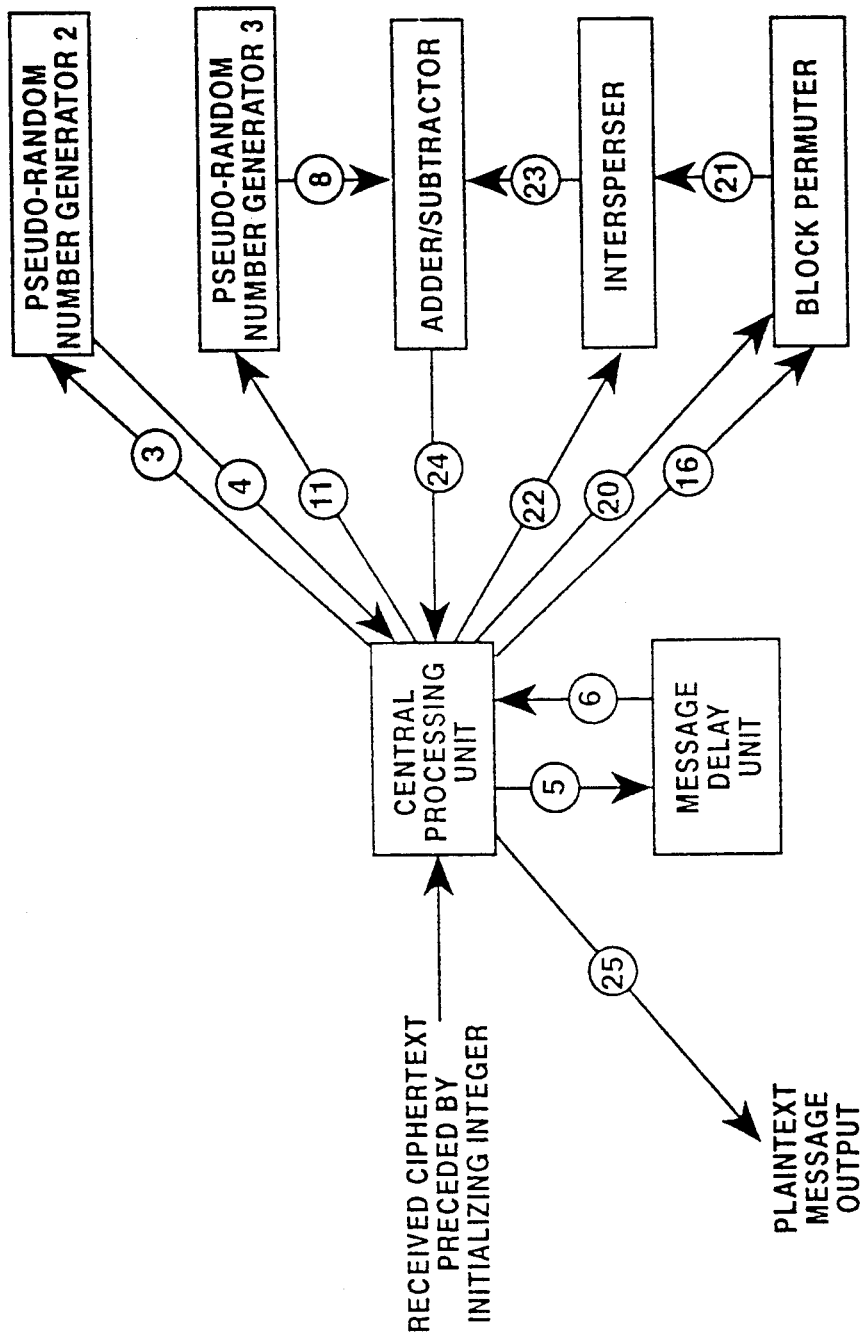
FIG. 4 is a flowchart illustrating the decryption of a message encrypted by the encryption device and method displayed in FIG. 3.

FIGS. 3 and 4 pertain to apparatus in which the masking tape has been replaced by pseudo-random number generators. In particular, FIG. 3 is a flowchart illustrating the encryption of a message in an embodiment of the invention in which a first PRNG generates the initializing integer; a second PRNG generates the numerical synonyms, and a third PRNG generates the masking tape string integer. (Of course, a single PRNG could do the work of the second and third PRNG's.)

In FIG. 3, upon receipt of a plaintext message, the CPU instructs $PRNG_1$, by link 1, to generate a pseudo-random number which is returned by link 2. The CPU extracts an initializing seed from the initializing integer generated by $PRNG_1$. $PRNG_1$ also sends the initializing integer, by link 9, to the transmitting means. The CPU sends the initializing seed, by link 3, to $PRNG_2$, which outputs a sequence of digits, successive blocks of which form the numerical synonyms of plaintext characters, and returns it to the CPU by link 4.

When the numerical codings have been loaded, the CPU sends the initializing seed (or a second initializing seed extracted from the initializing integer) to $PRNG_3$ by link 11. $PRNG_3$ now outputs the masking tape string integer to the adder/subtracter by link 8.

While the numerical codings for plaintext characters are being loaded into the CPU, the first few plaintext characters are routed to the message delay unit by link 5. Loading completed, they are retrieved by link 6, converted, along with the rest of the plaintext message, to the plaintext message string integer and sent to the adder/subtracter by link 7.

The ciphertext string is sent from the adder/subtracter by link 13 to the intersperser which breaks into the ciphertext string, upon instruction from the CPU by link 15, to insert pseudo-random integers brought in from $PRNG_2$ by link 14. The $PRNG_2$ is instructed to provide these inserted integers by the CPU, communicating through link 3.

The adulterated ciphertext string goes from the intersperser to the block permuter by link 17 where, upon instructions from the CPU by link 16, it is subjected to permutations of successive blocks of its digits. Any necessary "makeup" digits necessary to complete the last block permutation are supplied from $PRNG_2$ by link 18.

The permuted adulterated ciphertext string finally is sent to the transmitting means by link 19. Preceded by the initializing integer, it is sent off to the intended receiver as the body of the cryptogram.

Referring to FIG. 4, upon receiving a cryptogram, the CPU extracts the initializing seed from the initializing integer and sends a first portion of the following (the initializing integer) ciphertext string to the message delay unit by link 5. The CPU sends the initializing seed, by link 3, to $PRNG_2$, initiating its output, returned to the CPU by link 4. Successive blocks of digits output by $PRNG_2$ constitute the numerical synonyms for the plaintext alphabet characters.

When the numerical synonyms for plaintext characters have been loaded into the CPU, it recalls the first portion of the ciphertext string from the message delay unit, by link 6, and sends it and the rest of the ciphertext string, by link 20, to the block permuter. The block permuter, acting upon instructions delivered by link 16 from the CPU, undoes the block permutations of digits applied by the sender and sends the ciphertext string, which may still contain interspersed pseudo-random integers, to the intersperser by link 21. The intersperser, acting upon instructions from the CPU delivered by link 22, deletes prefixed, suffixed, or interspersed pseudo-random integers.

The now-unadulterated, unpermuted ciphertext string goes from the intersperser to the adder/subtracter by link 23. Meanwhile, the CPU has activated, by link 11, $PRNG_3$ with the initializing seed (or a second initializing seed extracted from the initializing integer). The resultant output of $PRNG_3$, the masking tape string integer, is carried to the adder/subtracter by link 8, where it is subtracted, to the right, from the ciphertext string. The result is the plaintext message string, returned to the CPU by link 24.

The CPU converts the plaintext message string, by means of the numerical synonyms of which it is composed, to the plaintext message, output by link 25 to, e.g., a printer.

The foregoing disclosure and description of the invention are illustrative and explanatory thereof, and various changes in the size, shape and materials, as well as in the details of the illustrated construction, may be made without departing from the spirit of the invention.

I claim:

1. A cipher system for use by a sender and a receiver, comprising:
   a. a source of plaintext alphabet characters;
   b. a sender central processing unit to receive a plaintext message of plaintext alphabet characters from the source and to encode each character by one of a set of numerical synonyms, the sender central processing unit including a memory to store the numerical synonyms.
   c. a receiver central processing unit to receive a stream of ciphertext message characters and to decode each character by said one of a set of numerical synonyms, the receiver central processing unit including a memory to store the numerical synonyms, the set of numerical synonyms comprising a collection of non-negative integers of common length extracted from a string of digits accessible to both sender and receiver by the sender or receiver central processing unit;
   d. a random or pseudo-random number generator to develop an initializing integer that determines the set of numerical synonym integers;
   e. the sender central processing unit further developing a concatenation of the numerical synonyms, comprising a plaintext message string integer corresponding to a plaintext message;
   f. a message delay unit for each of the sender and receiver central processing units to buffer characters received by the central processing units; and
   g. a masking tape memory to store a masking tape string integer comprising a sequence of digits extracted from a string of digits accessible to both sender and receiver, and added to the plaintext message string to form a ciphertext string.

2. A cryptographic method, comprising the steps of:
   a. generating a plaintext alphabet, each character of which is coded by a numerical synonym in a central processing unit, the set of numerical synonyms comprising a collection of non-negative integers of common length extracted from a string of digits accessible to both sender and receiver from a memory;

b. concatenating the numerical synonyms in the central processing unit, the concatenation comprising a plaintext message string integer corresponding to a plaintext message; and c. reading a masking tape string integer from a memory, the masking tape string integer comprising a sequence of digits extracted from a string of digits accessible to both sender and receiver, and added to the plaintext message string to form a ciphertext string.

3. The system of claim 1, wherein the numerical synonyms are extracted from a string of digits secretly shared by sender and receiver.

4. The system of claim 3, wherein the masking tape string is extracted from a string of digits secretly shared by sender and receiver.

5. The system of claim 3, wherein the starting position integer for extraction of numerical synonyms from the shared string of digits is transmitted with the cryptogram.

6. The system of claim 5, wherein the starting position integer is concealed in an initializing integer transmitted with the cryptogram.

7. The system of claim 6, wherein the initializing integer is generated by a number generator.

8. The system of claim 1, wherein the string of digits from which the numerical synonyms are extracted is the output of a pseudo-random number generator shared by sender and receiver.

9. The system of claim 8, wherein the initializing seed for the output of the pseudo-random number generator is concealed in an initializing integer transmitted with the cryptogram.

10. The system of claim 9, wherein the initializing integer is generated by a number generator.

11. The system of claim 4, wherein the starting position integer for extraction of the masking tape string from the shared string of digits is transmitted with the cryptogram.

12. The system of claim 11, wherein the starting position integer is concealed in an initializing integer transmitted with the cryptogram.

13. The system of claim 12, wherein the initializing integer is generated by a number generator.

14. The system of claim 1, wherein the string of digits from which the masking tape string integer is extracted is the output of a pseudo-random number generator shared by sender and receiver.

15. The system of claim 14, wherein the initializing seed for the output of the pseudo-random number generator is concealed in an initializing integer transmitted with the cryptogram.

16. The system of claim 15, wherein the initializing integer is generated by a number generator.

17. The system of claim 6, wherein the initializing integer is coded to identify prefixes, suffixes, interspersions, and block permutations in the ciphertext message string.

18. The system of claim 9, wherein the initializing integer is coded to identify prefixes, suffixes, interspersions, and block permutations in the ciphertext message string.

19. The system of claim 1, wherein the masking tape string integer is added to the right, with carries to the right, to the plaintext message string integer to form the ciphertext string integer.

20. The system of claim 17, wherein prefixed, suffixed, and interspersed integers are generated by a number generator.

21. The system of claim 18, wherein prefixed, suffixed, and interspersed integers are generated by a number generator.

22. The system of claim 6, wherein the initializing integer-ciphertext string is superencrypted by addition to a second masking tape string, identified by a second initializing integer.

23. The method of claim 2, wherein the numerical synonyms are extracted from a string of digits secretly shared by sender and receiver.

24. The method of claim 23, wherein the masking tape string is extracted from a string of digits secretly shared by sender and receiver.

25. The method of claim 23, wherein the starting integer position for extraction of numerical synonyms from the shared string of digits is transmitted with the cryptogram.

26. The method of claim 25, wherein the starting position integer is concealed in an initializing integer transmitted with the cryptogram.

27. The method of claim 26, wherein the initializing integer is generated by a number generator.

28. The method of claim 2, wherein the string of digits from which the numerical synonyms are extracted is the output of a pseudo-random number generator shared by sender and receiver.

29. The method of claim 28, wherein the initializing seed for the output of the pseudo-random number generator is concealed in an initializing integer transmitted with the cryptogram.

30. The method of claim 29, wherein the initializing integer is generated by a number generator.

31. The method of claim 24, wherein the starting position integer for extraction of the masking tape string from the shared string of digits is transmitted with the cryptogram.

32. The method of claim 31, wherein the starting position integer is concealed in an initializing integer transmitted with the cryptogram.

33. The method of claim 31, wherein the initializing integer is generated by a number generator.

34. The method of claim 26, wherein the initializing integer is coded to identify prefixes, suffixes, interspersions, and block permutations in the ciphertext message string.

35. The method of claim 29, wherein the initializing integer is coded to identify prefixes, suffixes, interspersions, and block permutations in the ciphertext message string.

36. The method of claim 2, wherein the masking tape string integer is added to the right, with carries to the right, to the plaintext message string integer to form the ciphertext string integer.

37. The system of claim 34, wherein prefixed, suffixed, and interspersed integers are generated by a number generator.

38. The method of claim 26, wherein the initializing integer-ciphertext message string is superencrypted by addition to a second masking tape string, identified by a second initializing integer.

39. The method of claim 2, wherein the string of digits from which the masking tape string integer is extracted is the output of a pseudo-random number generator shared by sender and receiver.

40. The method of claim 39, wherein the initializing seed for the output of the pseudo-random number generator is concealed in an initializing integer transmitted with the cryptogram.

41. The system of claim 40, wherein the initializing integer is generated by a number generator.

42. A transmitter for sending a plaintext message in encrypted form comprising:
   a. a central processor for receiving a plaintext message comprising plaintext characters;
   b. a number generator to produce an initializing integer to the central processor under the direction of the central processor;
   c. a masking tape to receive a starting integer extracted from the initializing integer by the central processor and to return a string of digits to the central processor to code for plaintext characters;
   d. a message delay unit to provide a buffer for plaintext characters until the central processor is ready to translate the plaintext characters into numerical synonyms;
   e. an adder/subtractor to receive masking tape segments from the masking tape and numerical synonyms from the central processor and to add the masking tape segments and the numerical synonyms to provide a sum; and
   f. a transmitting means to receive the sum and an initializing integer for the transmission to an intended receiver.

43. A receiver to receive ciphertext preceded by an initializing integer and decrypt the ciphertext into plaintext message output comprising:
   a. a central processor to receive the ciphertext and initializing integer and to extract a starting integer from the initializing integer;
   b. a masking tape to receive the starting integer from the central processor to index a digit string, sequentially chosen blocks of which comprise numerical synonyms of plaintext characters, to send the digit string to the central processor, and to develop masking tape string segments;
   c. a message delay unit to provide a buffer for ciphertext characters while the central processor is receiving numerical synonyms; and
   d. an adder/subtractor to receive masking tape segments from the masking tape and ciphertext from the central processor and to subtract the masking tape string segments from the ciphertext to provide a plaintext message string to the central processor which generates a plaintext message output.

44. A transmitter for sending a plaintext message in encrypted form comprising:
   a. a central processor for receiving a plaintext message comprising plaintext characters;
   b. a first number generator to produce an initializing integer to the central processor under the direction of the central processor to produce a first initializing seed;
   c. a second number generator that is a pseudo-random number generator to receive the initializing seed and to develop a sequence of digits, sequentially chosen blocks of which form numerical synonyms of plaintext characters for the central processor;
   d. a message delay unit to provide a buffer for plaintext characters until the central processor is ready to translate the plaintext characters into numerical synonyms;
   e. a third number generator that is a pseudo-random number generator to receive a second initializing seed from the central processor and to generate masking tape segments;
   f. an adder/subtractor to receive masking tape segments from the third number generator and a plaintext message string integer from the central processor and to add the masking tape segments and the plaintext message string to provide a ciphertext string;
   g. an interserser to receive the ciphertext string from the adder/subtractor and to insert pseudo-random integers from the second number generator under the control of the central processor to develop an adulterated ciphertext string;
   h. a permuter to receive the adulterated ciphertext string and to develop a permuted adulterated ciphertext string under the control of the central processor; and
   i. a transmitting means to receive the initializing integer from the first number generator and the permuted adulterated ciphertext string for transmission to an intended receiver.

45. A receiver to receive ciphertext preceded by an initializing integer and decrypt the ciphertext into plaintext message output comprising:
   a. a central processor to receive the ciphertext and initializing integer and to extract an initializing seed from the initializing integer;
   b. a first number generator that is a pseudo-random number generator to receive the initializing seed from the central processor to initiate production of a digit string, sequentially chosen blocks of which comprise numerical synonyms of plaintext characters, and to send the digit string to the central processor;
   c. a message delay unit to provide a buffer for ciphertext characters while the central processor is receiving numerical synonyms;
   d. a block permuter to receive ciphertext from the central processor to unpermute the ciphertext under the control of the central processor;
   e. an intersperser to receive the unpermuted ciphertext from the block permuter and, under the control of the central processor, to delete prefixed, suffixed, and interspersed pseudo-random integers from the unpermuted ciphertext;
   f. a second number generator to receive an initializing seed from the central processor and to develop a masking tape string integer;
   g. an adder/subtractor to subtract the masking tape integer from the ciphertext string to provide a plaintext message string to the central processor which generates a plaintext message output.

46. The system of claim 5, wherein the starting position integer for extraction of numerical synonyms from the shared string of digits is generally distinct from the starting position integer used for extraction of the masking tape string and is separately concealed in the initializing integer.

47. The method of claim 25, wherein the starting position integer for extraction of numerical synonyms from the shared string of digits is generally distinct from the starting position integer used for extraction of the masking tape string and is separately concealed in the initializing integer.

48. The system of claim 3, wherein the order in which plaintext alphabet characters are assigned numerical synonyms from the sequence of secretly shared digits is permuted from message to message according to prior secret arrangement of sender and receiver.

49. The method of claim 23, wherein the order in which plaintext alphabet characters are assigned numerical synonyms from the sequence of secretly shared digits is permuted from message to message according to prior secret arrangement of sender and receiver.

50. The system of claim 3, wherein the numerical synonyms for encryption-decryption are extracted from the shared string of digits, commencing at the end of the masking tape string of a prior message.

51. The method of claim 23, wherein the numerical synonyms for encryption-decryption of a plaintext message are extracted from the shared string of digits, commencing at the end of the masking tape string of a prior message.

52. The system of claim 3, wherein the starting position integer for extraction of numerical synonyms from the shared string of digits is transmitted concealed in a prior cryptogram.

53. The method of claim 23, wherein the starting position integer for extraction of numerical synonyms from the shared string of digits is transmitted concealed in a prior cryptogram.

* * * * *